(12) United States Patent
Lee et al.

(10) Patent No.: US 9,219,272 B2
(45) Date of Patent: Dec. 22, 2015

(54) SECONDARY PARTICLE AND LITHIUM BATTERY INCLUDING SECONDARY PARTICLE

(75) Inventors: So-Ra Lee, Yongin-si (KR); Jae-Myung Kim, Yongin-si (KR); Kyu-Nam Joo, Yongin-si (KR); Tae-Sik Kim, Yongin-si (KR); Jong-Hee Lee, Yongin-si (KR); Ui-Song Do, Yongin-si (KR); Young-Su Kim, Yongin-si (KR); Beom-Kwon Kim, Yongin-si (KR); Deok-Hyun Kim, Yongin-si (KR); Gu-Hyun Chung, Yongin-si (KR); Chang-Su Shin, Yongin-si (KR); Yong-Mi Yu, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 540 days.

(21) Appl. No.: 12/807,103

(22) Filed: Aug. 27, 2010

(65) Prior Publication Data

US 2011/0195308 A1   Aug. 11, 2011

(30) Foreign Application Priority Data

Feb. 9, 2010   (KR) .................. 10-2010-0012020

(51) Int. Cl.
*H01M 4/88*   (2006.01)
*H01M 4/131*   (2010.01)
(Continued)

(52) U.S. Cl.
CPC .............. *H01M 4/131* (2013.01); *H01M 4/133* (2013.01); *H01M 4/1393* (2013.01);
(Continued)

(58) Field of Classification Search
USPC .................. 429/231.8, 231.1–231.95, 217
See application file for complete search history.

(56) References Cited

U.S. PATENT DOCUMENTS 6,482,547 B1   11/2002   Yoon et al.
6,573,007 B2 *   6/2003   Majima et al. .............. 429/231.4
(Continued)

FOREIGN PATENT DOCUMENTS

JP   06-275271   9/1994
JP   08-273666   10/1996
(Continued)

OTHER PUBLICATIONS

B. Z. Jang, "Processing of nanographene platelets (NGPs) and NGP nanocomposites: a review" J Material Science (2008) 43 pp. 5092-5101.*

(Continued)

*Primary Examiner* — Ula C Ruddock
*Assistant Examiner* — Osei Amponsah
(74) *Attorney, Agent, or Firm* — Christie, Parker & Hale, LLP

(57) ABSTRACT

A secondary particle and a lithium battery including the same are provided wherein the secondary particle includes a plurality of primary particles and each primary particle contains n polycyclic nano-sheets disposed upon one another. The polycyclic nano-sheets include hexagonal rings of six carbon atoms linked to each other, wherein a first carbon and a second carbon have a distance therebetween of $L_1$. $L_2$ is a distance between a third carbon and a fourth carbon, and the arrangement of the polycyclic nano-sheets is such that $L_1 \geq L_2$. The secondary particle is used as a negative active material in the lithium battery, and the secondary particle contains pores, thereby allowing for effective intercalating and deintercalating of the lithium ions into the secondary particle to impart improved capacity and cycle lifespan.

14 Claims, 12 Drawing Sheets

(51) Int. Cl.
*H01M 4/133* (2010.01)
*H01M 4/1393* (2010.01)
*H01M 4/505* (2010.01)
*H01M 4/525* (2010.01)
*H01M 10/0525* (2010.01)
*H01M 4/02* (2006.01)

(52) U.S. Cl.
CPC ............ *H01M 4/505* (2013.01); *H01M 4/525* (2013.01); *H01M 10/0525* (2013.01); *H01M 2004/021* (2013.01); *Y02E 60/122* (2013.01)

(56) References Cited

U.S. PATENT DOCUMENTS

| | | | |
|---|---|---|---|
| 2005/0266314 | A1 | 12/2005 | Sheem et al. |
| 2007/0117015 | A1* | 5/2007 | Yamamoto et al. ........ 429/231.8 |
| 2009/0117467 | A1* | 5/2009 | Zhamu et al. ............. 429/231.8 |
| 2009/0130561 | A1* | 5/2009 | Matsumoto et al. ....... 429/231.8 |
| 2009/0269669 | A1* | 10/2009 | Kim et al. ................. 429/231.8 |
| 2010/0021819 | A1* | 1/2010 | Zhamu et al. ............. 429/231.8 |

FOREIGN PATENT DOCUMENTS

| | | |
|---|---|---|
| JP | 2000-053408 | 2/2000 |
| JP | 2004-087437 | 3/2004 |
| JP | 2007-059342 | 3/2007 |
| JP | 2008-251965 | 10/2008 |
| JP | 2009-538813 A | 11/2009 |
| JP | 2011-159622 | 8/2011 |
| KR | 2000-0019113 | 4/2000 |
| KR | 10-2001-0025602 A | 4/2001 |
| KR | 10-2005-0099697 | 10/2005 |
| KR | 10-2009-0052775 A | 5/2009 |
| WO | WO 2005/085825 A1 | 9/2005 |
| WO | WO 2007/137795 A1 | 12/2007 |
| WO | WO 2008/143692 A1 | 11/2008 |
| WO | WO2008143692 * 11/2008 | ............. C01B 31/00 |
| WO | WO 2009/061685 A1 | 5/2009 |

OTHER PUBLICATIONS

KIPO Notice of Allowance dated Mar. 28, 2012 for KR 10-2010-0012020, 5 pages.
Darsono et al., "Milling and dispersion of multi-walled carbon nanotubes in texanol", Applied Surface Science , Esevier, Amsterdam, NL, vol. 254, 2008, pp. 3412-3419.
Extended European Search Report dated Jul. 11, 2011 in corresponding Application No. 11152513.5, 7 pages.
Japanese Office action dated Nov. 6, 2012, for corresponding Japanese Patent application 2011-004825, (4 pages).
Patent Abstracts of Japan, and English machine translation of Japanese Publication 08-27666 listed above, (24 pages).
Patent Abstracts of Japan, and English machine translation of Japanese Publication 2008-251965 listed above, (44 pages).
Patent Abstracts of Japan, and English machine translation of Japanese Publication 2011-159622 listed above, (32 pages).
SIPO Office action dated Mar. 5, 2014, with English translation, corresponding to Chinese Patent application 201110032375.2, (20 pages).
SIPO Office action dated Nov. 3, 2014, with English translation, for corresponding Chinese Patent application 201110032375.2, (18 pages).

* cited by examiner

SECONDARY PARTICLE AND LITHIUM BATTERY INCLUDING SECONDARY PARTICLE

CROSS-REFERENCE TO RELATED APPLICATIONS

This application claims priority to and the benefit of Korean Patent Application No. 10-2010-0012020, filed on Feb. 9, 2010, in the Korean Intellectual Property Office, the entire content of which is incorporated herein by reference.

BACKGROUND

1. Field

One or more embodiments of the present invention relate to a material for a lithium battery and a lithium battery including the same.

2. Description of the Related Art

Lithium batteries have drawn attention for use as power sources for small portable electronic devices. Because lithium secondary batteries contain an organic electrolyte, they have a discharge voltage that is at least twice that of general batteries containing an aqueous alkali electrolyte, and thus have higher energy density.

Lithium-transition metal oxides having a structure that allows for intercalation of lithium ions may be used as positive active materials for lithium secondary batteries.

On the other hand, carbonaceous materials in various forms, such as artificial graphite, natural graphite and hard carbon, which allow intercalation and deintercalation of lithium ions, and non-carbonaceous materials such as silicon (Si) have been studied for use as negative active materials. Such non-carbonaceous materials exhibit a very high capacity density that is at least ten times greater than that of graphite. However, the cycle lifespan characteristics thereof may deteriorate due to volumetric expansion and shrinkage during charging and discharging of lithium. Thus, there is still a need to develop negative active materials having high performance.

SUMMARY

An aspect of one or more embodiments of the present invention is directed toward a secondary particle for a lithium battery that provides excellent capacity characteristics and cycle lifespan for the lithium battery.

An aspect of an embodiment of the present invention is directed toward a lithium battery with excellent capacity characteristics and cycle lifespan.

Additional aspects will be set forth in part in the description which follows and, in part, will be apparent from the description, or may be learned by practice of the presented embodiments.

According to one or more embodiments of the present invention, a secondary particle includes a plurality of primary particles, each of the plurality of primary particles having a structure in which n polycyclic nano-sheets are stacked upon one another along a direction perpendicular with respect to a first plane, wherein each of the polycyclic nano-sheets including hexagonal rings of six carbon atoms linked to each other, the hexagonal rings being fused to one another and arranged on the first plane, n is an integer from 2 to 100; a first carbon and a second carbon are selected from the n polycyclic nano-sheets to satisfy the condition $L_1 \geq L_2$, $L_1$ denotes a distance between the first carbon and the second carbon, $L_2$ denotes a distance between a third carbon and a fourth carbon arbitrarily selected from the n polycyclic nano-sheets, the third and fourth carbons being neither identical to each other nor the same as the first and second carbons, in a three dimensional (3D) x, y, and z coordinate system, the second carbon is located at $B(a, b, c)$ with respect to the first carbon located at the origin $A(0, 0, 0)$, a and b are each independently about 10 μm or less, and c is about 100 nm or less.

In one embodiment, the plurality of primary particles agglomerate with each other.

In one embodiment, adjacent carbon atoms in the polycyclic nano-sheets of each primary particle are linked by an $sp^2$ bond.

In one embodiment, a thickness of each of the polycyclic nano-sheets of each primary particle is in a range of the carbon atomic diameter plus or minus about one nanometer (±about 1 nm).

In one embodiment, n of the polycyclic nano-sheets is an integer from 2 to 10.

In one embodiment, c of each primary particle is in a range of the carbon atomic diameter×50±about 10 nm.

In one embodiment, c of each primary particle is in a range of about 0.1 nm to about 50 nm.

In one embodiment, c of each primary particle is in a range of about 0.1 nm to about 20 nm.

In one embodiment, the secondary particle has a smooth surface.

In one embodiment, the secondary particle is of a sphere- or egg-type.

In one embodiment, the secondary particle has pores therein.

In one embodiment, the secondary particle has a porosity in a range of about 1% to about 40%.

In one embodiment, the secondary particle has a $d_{50}$ of a longer particle diameter in a range of about 1 μm to about 50 μm.

In one embodiment, the secondary particle has a BET specific surface area in a range of about 1 $m^2/g$ to about 50 $m^2/g$.

In one embodiment, the secondary particle includes a carbon coating layer on a surface thereof.

In one embodiment, the carbon coating layer includes a chemical deposition resultant product of carbon and/or a pyrolysate of at coal-tar pitch, rayon, and/or polyacrylonitrile-based resin.

According to one or more embodiments of the present invention, a lithium battery includes a positive electrode having a positive active material; a negative electrode including the secondary particle described above; and an electrolyte.

In one embodiment, a lithium battery is provided wherein the positive electrode and/or the negative electrode further includes a conducting agent, wherein the conducting agent further includes carbon black, Ketjen black, acetylene black, artificial graphite, natural graphite, cupper powder, nickel powder, aluminum powder, silver powder, polyphenylene, and combinations thereof.

In one embodiment, a lithium battery is provided wherein the positive active material is selected from the group consisting of $Li_aNi_bCO_cMn_dG_eO_2$ where $0.90 \leq a \leq 1.1$, $0 \leq b \leq 0.9$, $0 \leq c \leq 0.5$, $0 \leq d \leq 0.5$, $e=0$, $LiMn_2O_4$, lithium titanate, and combinations thereof.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
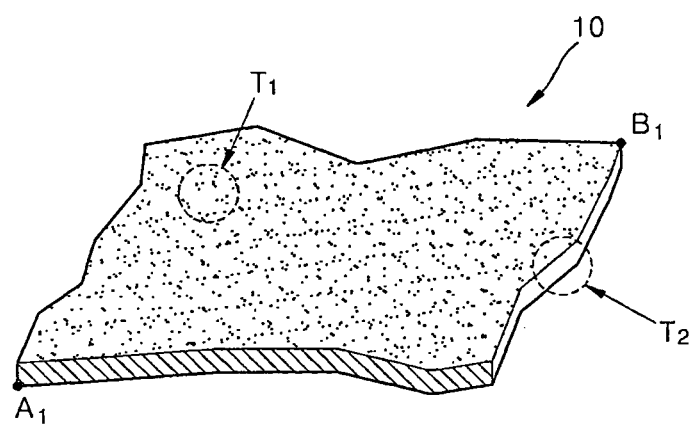
FIG. 1 is a schematic diagram illustrating one of a plurality of primary particles constituting a secondary particle according to an embodiment of the present invention.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description.

A secondary particle according to an embodiment of the present invention is composed of a plurality of primary particles. For example, the plurality of primary particles may agglomerate with each other, and thus the secondary particle may be an agglomeration of the plurality of primary particles.

The primary particle has a structure in which n polycyclic nano-sheets are stacked upon one another along a direction perpendicular with respect to a first plane, wherein each of the polycyclic nano-sheets includes hexagonal rings of six carbon atoms linked to each other, the hexagonal rings being fused to one another and arranged on the first plane. In this regard, n of the polycyclic nano-sheets may be an integer from 2 to 100. In addition, assuming that $L_1$ denotes a distance between a first carbon and a second carbon and $L_2$ denotes a distance between a third carbon and a fourth carbon arbitrarily selected from the n polycyclic nano-sheets so that the third and fourth carbons are neither identical to each other nor the same as the first and second carbons, and the first and second carbons are selected from the n polycyclic nano-sheets to satisfy the condition $L_1 \geq L_2$ and are positioned in a 3D x, y, and z coordinate system in such a way that the second carbon is located at B(a, b, c) with respect to the first carbon located at the origin A(0, 0, 0), a and b may be each independently about 10 μm or less, and c may be about 100 nm or less.

FIG. 1 is a schematic diagram illustrating one primary particle 10 of a plurality of primary particles constituting a secondary particle according to an embodiment of the present invention.

The primary particle 10 may have an irregular shape, but basically has a "planar" shape. Nevertheless, the primary particle 10 may have various shapes, for example, it may be bent or have a rolled end. The "planar" shape of the primary particle 10 will be more clearly understood based on the description of the primary particle 10 described below with reference to FIGS. 1 through 4 and FIGS. 6A and 6B.

The primary particle 10 has a structure in which n polycyclic nano-sheets are stacked upon one another along a direction perpendicular with respect to a first plane, wherein each of the polycyclic nano-sheets includes hexagonal rings of six carbon atoms linked to each other, the hexagonal rings being fused to one another and arranged on the first plane.

Figure 2:
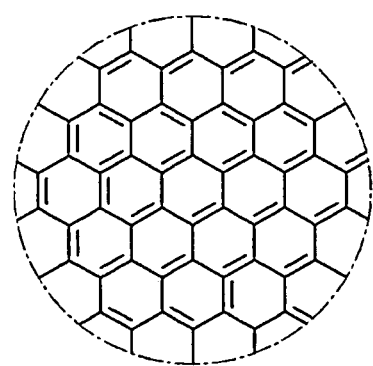
FIG. 2 is a molecular level enlarged schematic diagram of a region $T_1$ delimited by a dotted circle in FIG. 1, according to an embodiment of the present invention.

Throughout the specification, the wording "a hexagonal ring of six carbon atoms linked to each other" refers to a hexagonal ring including carbon atoms at respective apexes of a hexagon. This wording may also be referred to as a "six-membered carbocyclic ring." Each of the polycyclic nano-sheets includes a plurality of six-membered carbocyclic rings fused to one another, thereby forming a honeycomb structure having a form of a single layer in which the six-membered carbocyclic rings are arranged on the first plane. In this regard, "the arrangement of six-membered carbocyclic rings on the first plane" indicates the arrangement and extension of the six-membered carbocyclic rings in a lateral direction by fusing, and excludes the arrangement and extension thereof in a longitudinal direction. The expression "six-membered carbocyclic rings are fused to one another and arranged on the first plane" used herein will be more clearly understood with reference to FIG. 2. FIG. 2 is a molecular level enlarged diagram of a region $T_1$ delimited by a dotted circle in FIG. 1. Referring to FIG. 2, the plurality of six-membered carbocyclic rings are fused to each other, thereby forming a honeycomb structure having a form of a single layer in which the six-membered carbocyclic rings are arranged and extended in a lateral direction without a space therebetween. It is obvious to one of ordinary skill in the art that carbon atoms are positioned at respective apexes of each six-membered carbocyclic ring.

Adjacent carbon atoms in the polycyclic nano-sheets are linked by an $sp^2$ bond. Thus, a resonance structure is formed in the six-membered carbocyclic rings, thereby facilitating migration of electrons.

The polycyclic nano-sheets have a structure in which a plurality of six-membered carbocyclic rings are fused to each other and arranged on the first plane. Thus, the thickness of each polycyclic nano-sheet may be equal to, for example, a carbon atomic diameter plus or minus one nanometer (±1 nm), or ±about 1 nm. In this regard, the thickness of the polycyclic nano-sheet in a range of the carbon atomic diameter "±1 nm" or "±about 1 nm" refers to the polycyclic nano-sheet being bent, having a rolled end, and/or being partially broken. For example, the carbon atomic diameter may be 0.154 nm, and the thickness of each polycyclic nano-sheet may be 1.154 nm or less.

As described above, the primary particle 10 has a structure in which n polycyclic nano-sheets are stacked upon one another. In this regard, the n polycyclic nano-sheets are stacked upon one another along a direction perpendicular with respect to the plane on which the plurality of six-membered carbocyclic rings fused to each other are arranged.

Figure 3:
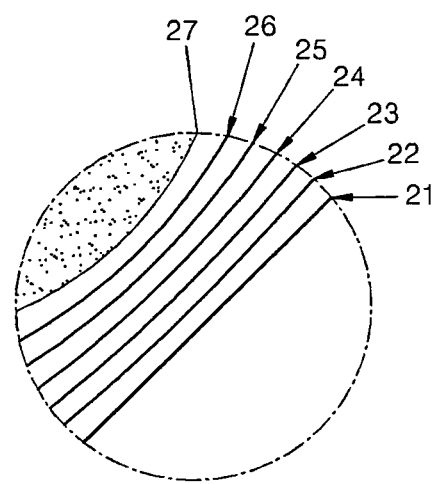
FIG. 3 is an enlarged schematic diagram of a region $T_2$ delimited by a dotted circle in FIG. 1, according to an embodiment of the present invention.

The above-described structure of the primary particle 10 will be more clearly understood with reference to FIGS. 2 and 3 showing an enlarged diagram of a region $T_2$ of FIG. 1. The n polycyclic nano-sheets may include a first polycyclic nano-sheet, a second polycyclic nano-sheet, a third polycyclic nano-sheet, . . . , a $(n-2)^{th}$ polycyclic nano-sheet, a $(n-1)^{th}$ polycyclic nano-sheet, and an $n^{th}$ polycyclic nano-sheet stacked upon one another in this order. The primary particle 10 of FIG. 3 includes n polycyclic nano-sheets, wherein n=7. Referring to FIG. 3, the primary particle 10 has a structure in which a first polycyclic nano-sheet 21, a second polycyclic nano-sheet 22, a third polycyclic nano-sheet 23, a fourth polycyclic nano-sheet 24, a fifth polycyclic nano-sheet 25, a sixth polycyclic nano-sheet 26 and a seventh polycyclic nano-sheet 27 are sequentially stacked. The first polycyclic nano-sheet 21 through the seventh polycyclic nano-sheet 27 are stacked along a direction perpendicular to the plane on which a plurality of six-member carbon rings are fused to each other and arranged in a lateral direction as illustrated in FIG. 2.

In this regard, n may be an integer from 2 to 100. For example, n may be an integer from 2 to 80, an integer from 2 to 70, an integer from 2 to 40, an integer from 2 to 20, or an integer from 2 to 10.

In the primary particle 10, assuming that the first and second carbons are selected from the n polycyclic nano-sheets of the primary particle 10 to satisfy the condition $L_1 \geq L_2$ and are positioned in a three dimensional (3D) x, y, and z coordinate system in such a way that the second carbon is located at B(a, b, c) with respect to the first carbon located at the origin A(0, 0, 0), a and b may be each independently about 10 μm or less, and c may be about 100 nm or less, wherein $L_1$ denotes a distance between a first carbon and a second carbon, and $L_2$ denotes a distance between a third carbon and a fourth carbon arbitrarily selected from the n polycyclic nano-sheets. In other words, the first and second carbons are two carbons with the largest distance therebetween from among all carbons in the n polycyclic nano-sheets.

Figure 4:
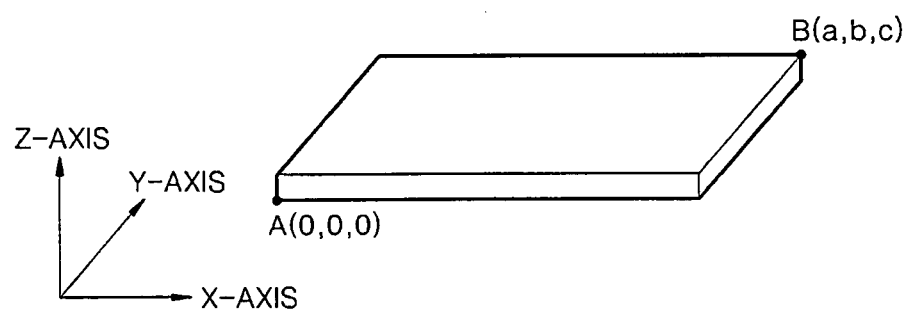
FIG. 4 is a schematic diagram of a first carbon located at a position $A_1$ of FIG. 1 and a second carbon located at a position $B_1$ of FIG. 1, wherein the second carbon is located at B(a, b, c) with respect to the first carbon located at the origin A(0, 0, 0), and the first and second carbons are superimposed on apexes of a virtual hexahedron to show a maximum distance between them.

For example, in the primary particle 10 of FIG. 1, the first carbon may be located at $A_1$, and the second carbon may be located at $B_1$. FIG. 4 is a schematic diagram of the first and second carbons selected from the polycyclic nano-sheets in a 3D x, y, and z coordinate system, wherein the second carbon is located at B(a, b, c) with respect to the first carbon located at the origin A(0, 0, 0), and the first and second carbons are superimposed on apexes of a virtual hexahedron to be described such that a maximum distance is between A and B. In this regard, a, b, and c respectively correspond to a width, a length, and a height of the virtual hexahedron, which may also be construed as a width, a length, and a height of a virtual hexahedron in which the primary particle 10 of FIG. 1 is compactly accommodated.

In this regard, a and b may be each independently 10 μm or less (or about 10 um or less), for example, in a range of 1 μm to 10 μm (or about 1 μm to about 10 μm).

In addition, c may be in a range of the carbon atomic diameter×50±10 nm. In this regard, the expression "carbon atomic diameter×50" (i.e. fifty times the atomic diameter of carbon) refers to the primary particle 10 having a maximum number of fifty polycyclic nano-sheets. The "±10 nm" or "±about 10 nm" refers to the primary particle 10 being bent, having a rolled end, and/or being partially broken. For example, the carbon atomic diameter may be 0.154 nm and c may be 17.7 nm or less.

In particular, c may be 100 nm or less, (or about 100 nm or less). For example, c may be in a range of 0.1 nm to 100 nm (or about 0.1 nm to about 100 nm), 0.1 nm to 90 nm, (or about 0.1 nm to about 90 nm), 0.1 nm to 50 nm (or, about 0.1 nm to about 50 nm), or 0.1 nm to 20 nm (or, about 0.1 nm to about 20 nm), but is not limited thereto.

In one embodiment, when a, b, and c of the primary particle 10 are within the ranges above, the transfer of electrons in the primary particle 10 are facilitated, and thus the primary particle 10 has excellent conductivity.

Powder of the primary particle includes a plurality of individual primary particles. A detailed description of each primary particle contained in the primary particle powder is the same as described above.

The plurality of primary particles of the primary particle powder may have different shapes and sizes. Thus, the primary particle powder may be defined based on the above description of each primary particle and a particle size distribution of the primary particle powder. For example, each primary particle of the primary particle powder has dimensions a, b, and c as defined above, wherein the particle size distribution of the primary particle powder may be defined according to the diameter $d_{50}$ of each of a, b, and c of the primary particle. The diameter $d_{50}$ is the average particle size (the average equivalent diameter) at which 50 mass-% (of the particles) of the powder have a larger equivalent diameter, and the other 50 mass-% have a smaller equivalent diameter. Hence the average particle size is denoted as equivalent $d_{50}$.

The diameter $d_{50}$ of each of a and b of the primary particle powder may be independently about 10 μm or less, for example, in a range of about 1 μm to about 10 μm.

The diameter $d_{50}$ of c of the primary particle powder may be in a range of carbon atomic diameter×50±10 nm (or ±about 10 nm). In this regard, the expression "carbon atomic diameter×50" refers to each primary particle of the primary particle powder having a maximum number of fifty polycyclic nano-sheets. The expression "about ±10 nm" refers to each primary particle of the primary particle powder being bent, having a rolled end, and/or being partially broken.

The diameter $d_{50}$ of c of the primary particle powder may be 100 nm or less. For example, the diameter $d_{50}$ of c of the primary particle powder may be in a range of 0.1 nm to 100 nm (or about 0.1 nm to about 100 nm), 0.1 nm to 90 nm, (or about 0.1 nm to about 90 nm), 0.1 nm to 50 nm (or, about 0.1 nm to about 50 nm), or 0.1 nm to 20 nm (or, about 0.1 nm to about 20 nm), but is not limited thereto.

The primary particle powder may be prepared using graphite as a starting material. For example, a method of preparing the primary particle powder may involve swelling graphite; adding a solvent to the swollen graphite and grinding the swollen graphite in the solvent; and removing the solvent from the ground product. The method of preparing the primary particle powder will now be described in more detail.

First, graphite is heated to swell, followed by removing gas generated during the heating. In this regard, a starting material may be swollen graphite, but is not limited thereto. In one embodiment, a heating temperature for swelling the graphite is in a range of 400° C. to 600° C., (or about 400° C. to about 600° C.), and a heating time is in a range of 30 minutes to 2 hours (or, about 30 minutes to about 2 hours). When the heating temperature and the heating time are within these ranges, the binding of carbon atoms are not substantially damaged, and the graphite swells to the extent that "c" of the primary particle powder or "$d_{50}$ of c" of the primary particle powder is within the ranges defined above.

Next, optionally, gas generated when the graphite swells may be removed. In one embodiment, the gas is an oxide generated by combination of impurities (for example, non-carbonic atoms or molecules) present in the graphite with oxygen. For example, the gas is $SO_2$, but is not limited thereto. In the heating of the graphite to swell, such impurities present in the graphite may be sintered to remove them. Thus, the primary particle powder has an improved purity.

Next, a solvent is added to the swollen graphite, and then the swollen graphite in the solvent is ground. The solvent may be any solvent that does not substantially react with the swollen graphite and cause the swollen graphite to flow. For example, the solvent may be an alcohol, but is not limited thereto. In one embodiment, the solvent is ethanol.

The swollen graphite in the solvent may be ground in various suitable ways, for example, using a homogenizer and/or a microfluidizer. In one embodiment, the grinding is repeatedly performed several times. For example, the grinding may be performed two or more times using a combination of suitable grinding methods. The grinding may be performed in various suitable ways. In one embodiment, the swollen graphite is mixed with an arbitrary acid before being ground. In one embodiment, at least one of a and b of the primary particle is adjusted by suitably varying the number of grinding processes performed using a microfluidizer.

Next, the solvent is removed to obtain the primary particle powder. The solvent may be removed in various suitable ways. However, the physical characteristics of the solvent should be considered to select a suitable method. In one embodiment, the ground product is filtered, washed, and then thermally treated at 80° C.

The secondary particle may be composed of the plurality of primary particles as described above. For example, the secondary particle is an agglomeration of the plurality of primary particles. In one embodiment, the secondary particle is formed by applying a given pressure, rotation force, and/or the like to the plurality of primary particles to agglomerate with each other.

The secondary particle may be prepared by agglomerating and/or spherizing the plurality of primary particles. Thus, the secondary particle has a smooth surface. In addition, the secondary particle may be of a sphere- or egg-type, but is not limited thereto. The surface and shape of the secondary particle will be later described in more detail with reference to FIG. 8.

In one embodiment, the $d_{50}$ of a longer particle diameter of the secondary particle (or secondary particle powder) is in a range of 1 μm to 50 μm (or, about 1 μm to about 50 μm). In another embodiment, the $d_{50}$ of a longer particle diameter of the secondary particle is in a range of 1 μm to 20 μm (or, about 1 μm to about 20 μm). When the $d_{50}$ of the longer particle diameter of the secondary particle is within the range above, lithium ions are effectively intercalated and deintercalated into the secondary particle.

The secondary particle may have pores. In one embodiment, the pores are formless. In one embodiment, there are at least two pores in the secondary particle. The pores may be of various suitable types. In one embodiment, the pores extend to a surface of the secondary particle and are exposed to the outside. In another embodiment, the pores are only inside the secondary particle. Although the present invention is not limited to any particular principle, the secondary particle is composed of the plurality of primary particles, and thus the pores can be empty spaces between the primary particles. The pores do not exist in hard carbon or graphite which are commonly used as negative active material. Pores may provide a wider contact area between the secondary particle and lithium ions. Thus, according to one embodiment, the secondary particle of the present invention has excellent capacity and cycle lifespan characteristics.

In one embodiment, a secondary particle having pores has a porosity in a range of 1 to 40% (or, about 1% to about 40%). In one embodiment a secondary particle has a porosity in a range of 2% to 10% (or, about 2% to about 10%). The porosity may be defined as a percentage (%) of the volume of all pores in the secondary particle based on the total volume of the secondary particle.

The secondary particle may have a BET specific surface area. In one embodiment, the BET specific surface area of the secondary particle is in a range of 1 $m^2/g$ to 50 $m^2/g$ (or, about 1 $m^2/g$ to about 50 $m^2/g$). In one embodiment, the BET specific surface area of the secondary particle is in a range of 3 $m^2/g$ to 25 $m^2/g$ (or, about 3 $m^2/g$ to about 25 $m^2/g$). When the BET specific surface area of the secondary particle is within the range above, the secondary particle has excellent capacity and cycle lifespan characteristics.

In one embodiment, the secondary particle has a carbon coating layer on a surface thereof. The carbon coating layer enhances the conductivity of the secondary particle.

The carbon coating layer may be formed by chemically depositing carbon on the surface of the secondary surface. Alternatively, the carbon coating layer is formed by providing the surface of the secondary particle with coal-tar pitch, rayon, polyacrylonitrile-based resin, and/or a precursor thereof, and then pyrolysing the material and/or the precursor thereof. Thus, the carbon coating layer includes a chemical deposition resultant product of carbon and/or a pyrolysate of coal-tar pitch, rayon, and/or polyacrylonitrile-based resin, but is not limited thereto.

In one embodiment, the secondary particle is prepared by preparing the primary particle and spherizing the primary particle to obtain the second particle composed of a plurality of the primary particles. The method of preparing the primary particle is described above. The spherizing of the primary particle may be performed using any suitable method known in the art. In one embodiment, a primary particle powder is put into a spherizer, the primary particle powder is rotated by operating the spherizer, and the primary particles agglomerate with each other due to a centrifugal force, thereby obtaining a secondary particle.

After the primary particle is spherized to obtain a secondary particle composed of a plurality of the primary particles, the secondary particle may be further heat-treated. The heat treatment process allows binding between the primary particles and/or rearrangement thereof, and thus the secondary particle of the present invention has enhanced fine structure. Conditions of the heat treatment process may vary according to a size of a secondary particle to be formed, or a size of a primary particle used. In one embodiment, the heat treatment process is performed at a temperature in a range of 1000° C. to 3000° C. (or, about 1000° C. to about 3000° C.) for 1 hour to 10 hours (about 1 hour to about 10 hours) in a reduced atmosphere and/or an inert atmosphere.

According to another embodiment of the present invention, a lithium battery includes a positive electrode containing a positive active material; a negative electrode containing the secondary particle described above; and an electrolyte. In one embodiment, the secondary particle is used as a negative active material, and a large amount of lithium ions are effectively intercalated thereinto and deintercalated therefrom so that a lithium battery including the secondary particle has a high capacity and a long lifespan.

In one embodiment, the positive electrode includes a current collector and a positive active material layer formed on the current collector. A compound (e.g. a lithiated intercalation compound) which allows reversible intercalation and deintercalation of lithium may be used as the positive active material for forming the positive active material layer. Non-limiting examples of the positive active material include compounds represented by the following formulae: $Li_aA_{1-b}X_bD_2$ (wherein $0.95 \leq a \leq 1.1$, and $0 \leq b \leq 0.5$); $Li_aE_{1-b}X_bO_{2-c}D_c$ (wherein $0.95 \leq a \leq 1.1$, $0 \leq b \leq 0.5$, and $0 \leq c \leq 0.05$); $LiE_{2-b}X_bO_{4-c}D_c$ (wherein $0 \leq b \leq 0.5$, and $0 \leq c \leq 0.05$); $Li_aNi_{1-b-c}Co_b-BcD_\alpha$ (wherein $0.95 \leq a \leq 1.1$, $0 \leq b \leq 0.5$, $0 \leq c \leq 0.05$, and $0 < \alpha \leq 2$); $Li_aNi_{1-b-c}Co_bX_cO_{2-\alpha}M_\alpha$ (wherein $0.95 \leq a \leq 1.1$, $0 \leq b \leq 0.5$, $0 \leq c \leq 0.05$, and $0 < \alpha \leq 2$); $Li_aNi_{1-b-c}Co_bX_cO_{2-\alpha}M_2$ (wherein $0.95 \leq a \leq 1.1$, $0 \leq b \leq 0.5$, $0 \leq c \leq 0.05$, and $0 < \alpha < 2$); $Li_aNi_{1-b-c}Mn_bX_cD_\alpha$ (wherein $0.95 \leq a \leq 1.1$, $0 \leq b \leq 0.5$, $0 \leq c \leq 0.05$, and $0 < \alpha \leq 2$); $Li_aNi_{1-b-c}Mn_bX_cO_{2-\alpha}M_\alpha$ (wherein $0.95 \leq a \leq 1.1$, $0 \leq b \leq 0.5$, $0 \leq c \leq 0.05$, and $0 < \alpha < 2$); $Li_aNi_{1-b-c}Mn_bX_cO_{2-\alpha}M_2$ (wherein $0.95 \leq a \leq 1.1$, $0 \leq b \leq 0.5$, $0 \leq c \leq 0.05$, and $0 < \alpha < 2$); $Li_aNi_bE_cG_dO_2$ (wherein $0.90 \leq a \leq 1.1$, $0 \leq b \leq 0.9$, $0 \leq c \leq 0.5$, and $0.001 \leq d \leq 0.1$); $Li_aNi_bCo_cMn_dG_eO_2$ (wherein $0.90 \leq a \leq 1.1$, $0 \leq b \leq 0.9$, $0 \leq c \leq 0.5$, $0 \leq d \leq 0.5$, $0 \leq e \leq 0.1$); $Li_aNiG_bO_2$ (wherein $0.90 \leq a \leq 1.1$, and $0.001 \leq b \leq 0.1$); $Li_aCoG_bO_2$ (wherein $0.90 \leq a \leq 1.1$, and $0.001 \leq b \leq 0.1$); $Li_aMnG_bO_2$ (wherein $0.90 \leq a \leq 1.1$, and $0.001 \leq b \leq 0.1$); $Li_aMn_2G_bO_4$ (wherein $0.90 \leq a \leq 1.1$, and $0 \leq b \leq 0.1$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); $LiFePO_4$; lithium titanate, and combinations thereof.

In the above formulae, A is selected from the group consisting of nickel (Ni), cobalt (Co), manganese (Mn), and combinations thereof; X is selected from the group consisting of aluminum (Al), nickel (Ni), cobalt (Co), manganese (Mn), chromium (Cr), iron (Fe), magnesium (Mg), strontium (Sr), vanadium (V), a rare earth element, and combinations thereof; D is selected from the group consisting of oxygen (O), fluorine (F), sulfur (S), phosphorus (P), and combinations thereof; E is selected from the group consisting of cobalt (Co), manganese (Mn), and combinations thereof; M is selected from the group consisting of fluorine (F), sulfur (S), phosphorus (P), and combinations thereof; G is selected from the group consisting of aluminum (Al), chromium (Cr), manganese (Mn), iron (Fe), magnesium (Mg), lanthanum (La), cerium (Ce), strontium (Sr), vanadium (V), and combinations thereof; Q is selected from the group consisting of titanium (Ti), molybdenum (Mo), manganese (Mn), and combinations thereof; Z is selected from the group consisting of chromium (Cr), vanadium (V), iron (Fe), scandium (Sc), yttrium (Y), and combinations thereof; and J is selected from the group consisting of vanadium (V), chromium (Cr), manganese (Mn), cobalt (Co), nickel (Ni), copper (Cu), and combinations thereof.

In one embodiment, the positive active material is lithium titanate.

Non-limiting examples of lithium titanate include a spinel-type lithium titanate, an anatase-type lithium titanate, and a ramsdellite-type lithium titanate, which are classified according to the respective crystal structures.

In one embodiment, the positive active material is represented by $Li_{4-x}Ti_5O_{12}$ ($0 \leq x \leq 3$). For example, the positive active material is $Li_4Ti_5O_{12}$.

Non-limiting examples of the positive active material include $Li_aNi_bCO_cMn_dG_eO_2$ (wherein $0.90 \leq a \leq 1.1$, $0 \leq b \leq 0.9$, $0 \leq c \leq 0.5$, $0 \leq d \leq 0.5$, and $e=0$ (that is, $Li_aNi_bCO_cMn_dO_2$), and for example, $a=1$, $b=0.5$, $c=0.2$, $d=0.3$, and $e=0$), and $LiMn_2O_4$.

Alternatively, Li electrode may be used as the positive electrode. The compound used as a positive active material may have a coating layer on a surface thereof. Alternatively, a mixture of the compound as described above and the compound having a coating layer are used. In one embodiment, the coating layer may include at least one coating element compound selected from the group consisting of oxides, hydroxides, oxyhydroxides, oxycarbonates, hydroxycarbonates, and combinations thereof. The coating element compound constituting the coating layer may be amorphous or crystallined. In one embodiment, the coating element contained in the coating layer is magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a mixture thereof.

The coating layer may be formed using any suitable method. In one embodiment, a spray coating method, and/or a dipping method is used. Alternatively, a similar method to a spray coating and/or dipping method is used that does not adversely affect the physical properties of the positive active material when a coating element compound is used. Here, any suitable dipping, spray coating and/or similar method may be utilized.

The positive active material layer may further include a binder.

The binder functions to strongly bind positive active material particles with each other and to a current collector. Non-limiting examples of the binder include polymers including polyvinyl alcohol, carboxymethyl cellulose, hydroxypropyl cellulose, diacetyl cellulose, polyvinyl chloride, carboxylated polyvinyl chloride, polyvinyl fluoride, ethylene oxide, polyvinylpyrrolidone, polyurethane, polytetrafluoroethylene, polyvinylidene fluoride, polyethylene, polypropylene, styrene-butadiene rubber (SBR), acrylated SBR, epoxy resin, and nylon.

The current collector may be formed of Al, but is not limited thereto.

In one embodiment the positive electrode is manufactured by mixing the positive active material and the binder (and optionally including a conducting agent) in a solvent to prepare a composition for forming a positive active material layer and by coating the composition on the current collector. Here, any suitable method may be utilized to manufacture the positive electrode. In one embodiment, the solvent is N-methylpyrrolidione.

The positive active material layer may further include a conducting agent. The conducting agent may be at least one selected from the group consisting of carbon black, Ketjen black, acetylene black, artificial graphite, natural graphite, cupper powder, nickel powder, aluminum powder, silver powder, and/or polyphenylene.

In one embodiment, the negative electrode includes the secondary particle as described herein, as a negative active material. Alternatively, according to performances of a lithium battery to be manufactured, the secondary particle is mixed with natural graphite, a silicon/carbon complex, silicon metal, silicon thin film, lithium metal, a lithium alloy, a carbonaceous material, and/or graphite. For example, the lithium alloy may be a lithium titanate. Examples of the lithium titanate include a spinel-type lithium titanate, an anatase-type lithium titanate, and a ramsdellite-type lithium titanate, which are classified according to their respective crystal structures.

In one embodiment, the binder and the solvent used in a composition for forming a negative active material layer are the same as those used in the positive active material composition. A detailed description of the conducting agent that may be optionally included in the composition for forming a negative active material layer is described above. If desired, a plasticizer may be further added to the composition for forming a positive active material layer and the composition for forming a negative active material layer to form pores in electrode plates.

In one embodiment, the electrolyte includes a non-aqueous organic solvent and a lithium salt.

The non-aqueous organic solvent is capable of functioning as a medium in which ions involved in electrochemical reactions in batteries are transferred.

Non-limiting examples of the non-aqueous organic solvent include a carbonate-based solvent, an ester-based solvent, an ether-based solvent, a ketone-based solvent, an alcohol-based solvent, an aprotic solvent, and combinations thereof. Non-limiting examples of the carbonate-based solvent include dimethyl carbonate (DMC), diethyl carbonate (DEC), dipropyl carbonate (DPC), methylpropyl carbonate (MPC), ethylpropyl carbonate (EPC), ethyl methyl carbonate (EMC), ethylene carbonate (EC), propylene carbonate (PC), butylene carbonate (BC), methyl ethyl carbonate (MEC), and combinations thereof. Non-limiting examples of the ester-based solvent include methyl acetate, ethyl acetate, n-propyl acetate, dimethyl acetate, methyl propionate, ethyl propionate, γ-butyrrolactone, decanolide, valerolactone, mevalonolactone, caprolactone, and combinations thereof. Examples of the ether-based solvent include dibutyl ether, tetraglyme, diglyme, dimethoxyethane, 2-methyltetrahydrofuran, tetrahydrofuran, and combinations thereof. The ketone-based solvent may be cyclohexanone. Non-limiting examples of the alcohol-based solvent include ethyl alcohol, isopropyl alcohol, and the like. In one embodiment, the aprotic solvent includes nitrils, such as R—CN (wherein R is a straight, branched or cyclic $C_2$-$C_{20}$ hydrocarbon group, which has a double-bonded aromatic ring or an ether bond); amides, such as dimethylformamide; dioxolanes, such as 1,3-dioxolane; and sulfolanes.

In one embodiment, the non-aqueous organic solvent is used alone. In one embodiment, at least two of the non-aqueous organic solvents are used in combination. In this case, a mixing ratio of the at least two of the non-aqueous organic solvents are appropriately adjusted according to the performance of the battery, which is obvious to one of ordinary skill in the art.

The lithium salt is dissolved in the organic solvent and functions as a source of lithium ions in the battery, enabling the basic operation of the lithium battery. In addition, the lithium salt facilitates the migration of lithium ions between the positive electrode and the negative electrode. Examples of the lithium salt include at least one supporting electrolyte salt selected from $LiPF_6$, $LiBF_4$, $LiSbF_6$, $LiAsF_6$, $LiN(SO_2C_2F_6)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ wherein x and y are natural numbers, LiCl, LiI, $LiB(C_2O_4)_2$ (LiBOB; lithium bis (oxalato) borate), and combinations thereof. The concentration of the lithium salt may be in a range of 0.1 to 2.0M (or, about 0.1 to about 2.0 M). In one embodiment, if the concentration of the lithium salt is within this range, the electrolyte has an appropriate conductivity and viscosity, and thus exhibits excellent performance, allowing the lithium ions to effectively migrate.

A separator may be disposed between the positive electrode and the negative electrode according to the type of the lithium battery. In one embodiment, the separator is a monolayer formed of polyethylene, polypropylene, or polyvinylidene fluoride, or a multilayer including at least two of the layers. The multilayer may be a mixed multilayer. In one embodiment, the separator is a two-layered separator including polyethylene and polypropylene layers, a three-layered separator including polyethylene, polypropylene and polyethylene layers, or a three-layered separator including polypropylene, polyethylene and polypropylene layers.

Lithium batteries may be classified into lithium ion batteries, lithium ion polymer batteries, and lithium polymer batteries according to the types of separator and electrolyte used therein. In addition, lithium batteries may also be classified into a cylindrical type, a rectangular type, a coin type, and a pouch type according to the battery shape, and may further be classified into a bulk type and a thin film type according to the battery size. Lithium batteries can be used either as primary lithium batteries or secondary lithium batteries. Here, any suitable method may be utilized to manufacture a lithium battery.

Figure 5:
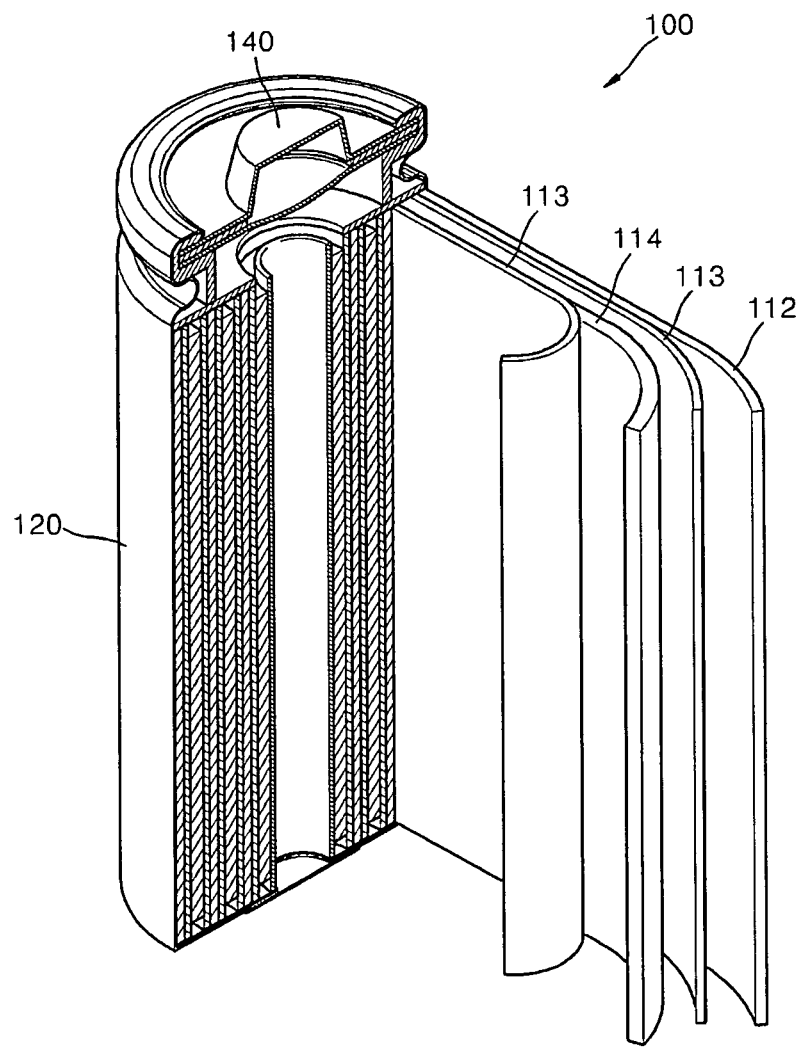
FIG. 5 is an exploded perspective view of a lithium battery according to an embodiment of the present invention.

FIG. 5 is a schematic view of a structure of a lithium battery 100 according to an embodiment of the present invention. Referring to FIG. 5, the lithium battery 100 according to the present embodiment includes: a positive electrode 114; a negative electrode 112; a separator 113 disposed between the positive electrode 114 and the negative electrode 112; an electrolyte impregnated into the positive electrode 114, the negative electrode 112 and the separator 113; a battery case 120; and a sealing member 140 for sealing the case 120. The lithium battery 100 is manufactured by sequentially stacking the positive electrode 114, the negative electrode 112, and the separator 113 to form a stack, winding the stack in a spiral form, and accommodating the wound stack in the battery case 120.

Hereinafter, one or more embodiments of the present invention will be described in detail with reference to the following examples. However, these examples are not intended to limit the purpose and scope of the present invention.

EXAMPLES

Synthesis Example 1

100 g of swollen graphite was heated at 500° C. for 1 hour to swell, and the gas generated during the heating was exhausted through a ventilation hole to obtain a swollen graphite product. The swollen graphite product was dispersed in ethanol and ground using a homogenizer at 10,000 rpm for 10 minutes to obtain a ground mixture. The ground mixture was further ground using a microfluidizer, filtered using filtering equipment, washed with ethanol, and dried in an oven at 120° C. to obtain a primary particle powder.

Figure 6A:
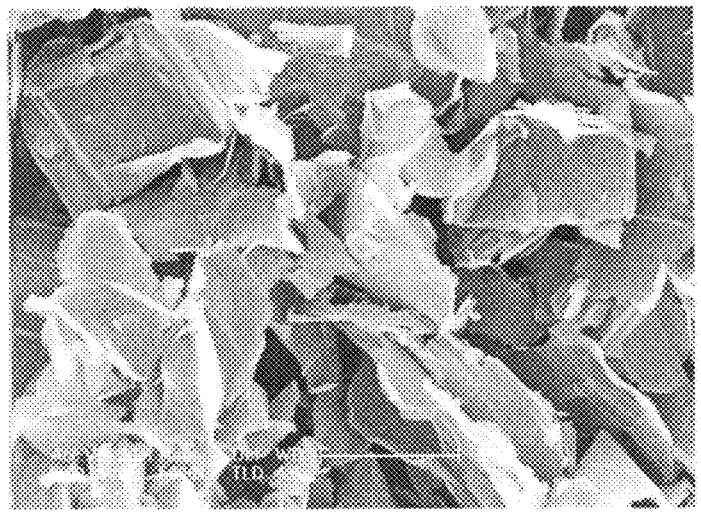
FIG. 6A is a scanning electron microscopic (SEM) image of a primary particle prepared according to Synthesis Example 1.

FIG. 6A is a scanning electron microscopic (SEM) image of the primary particle powder. Referring to FIG. 6A, it can be seen that each of a plurality of primary particles contained in the primary particle powder basically had a planar shape.

Figure 6B:
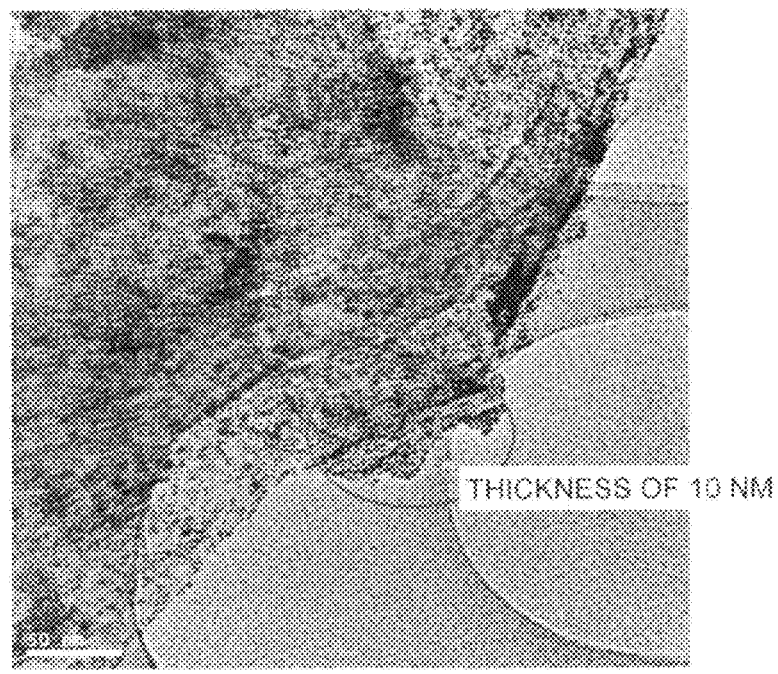
FIG. 6B is a transmission electron microscopic (TEM) image of the primary particle of Synthesis Example 1.

FIG. 6B is a transmission electron microscopic (TEM) image of the primary particle. Referring to FIG. 6B, as can be seen in a region delimited by a dotted circle, which corresponds to the region $T_2$ of FIG. 1, the primary particle has a thickness of about 10 nm. In other words, as identified in FIG.

6B, each primary particle of the primary particle powder prepared as described above had a "c" of about 10 nm, wherein "c" is defined above in connection with FIGS. 1 and 4.

Figure 7:
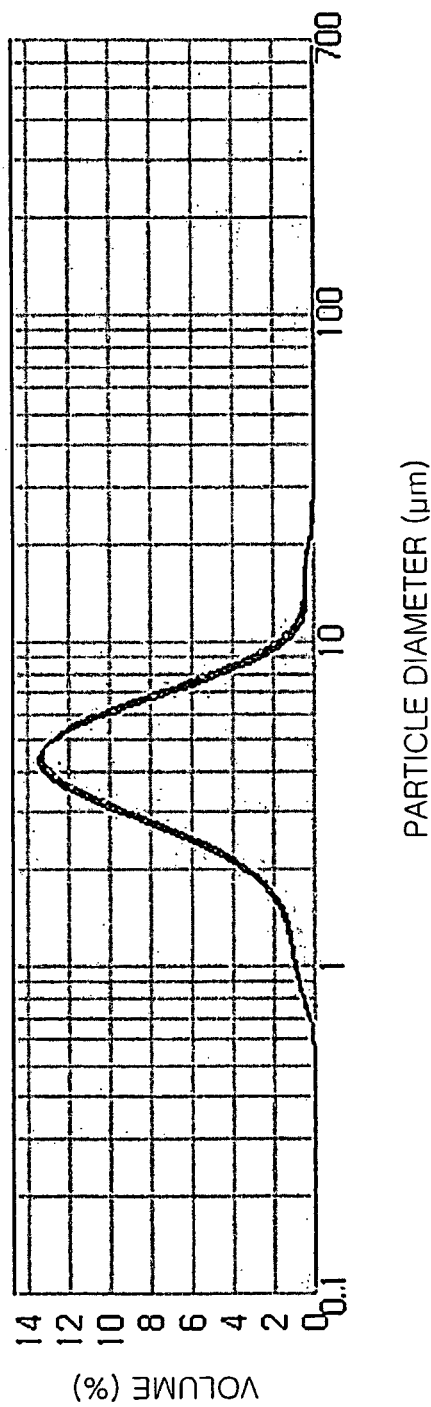
FIG. 7 is a graph showing particle size distribution results of the primary particle of Synthesis Example 1.

In addition, a particle size distribution of each primary particle was measured using a Hydro2000 (Malvern Instruments Ltd.). The results are shown in FIG. 7. Referring to FIG. 7, $d_{10}$, $d_{50}$ and $d_{90}$ of "a" or "b" of the primary particle powder were 2.1 µm, 4.11 µm and 7.16 µm, respectively, wherein "a" and "b" are defined above in connection with FIGS. 1 and 4.

15 g of the primary particle was put into a spherizer (Model Name: NHS, manufactured by NARA MACHINERY CO., LTD), and the spherizer was operated at 14,500 rpm for 10 minutes to obtain a secondary particle composed of a plurality of the primary particles, that is, an agglomeration of the plurality of the primary particles.

Figure 8:
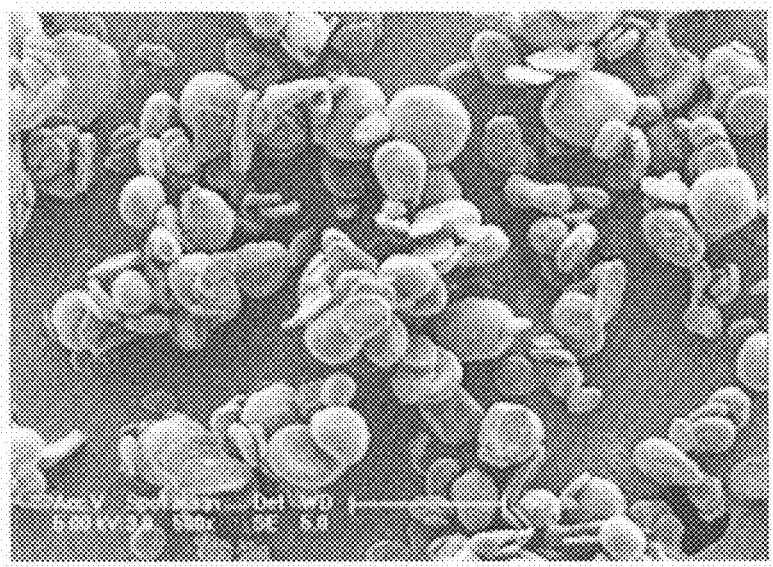
FIG. 8 is a SEM image of a secondary particle prepared according to Synthesis Example 1.

FIG. 8 is a SEM image of the secondary particle prepared as above. Referring to FIG. 8, it can be seen that the secondary particle is of a sphere-type or an egg-type, and the surface of the secondary particle is substantially smooth.

Figure 9:
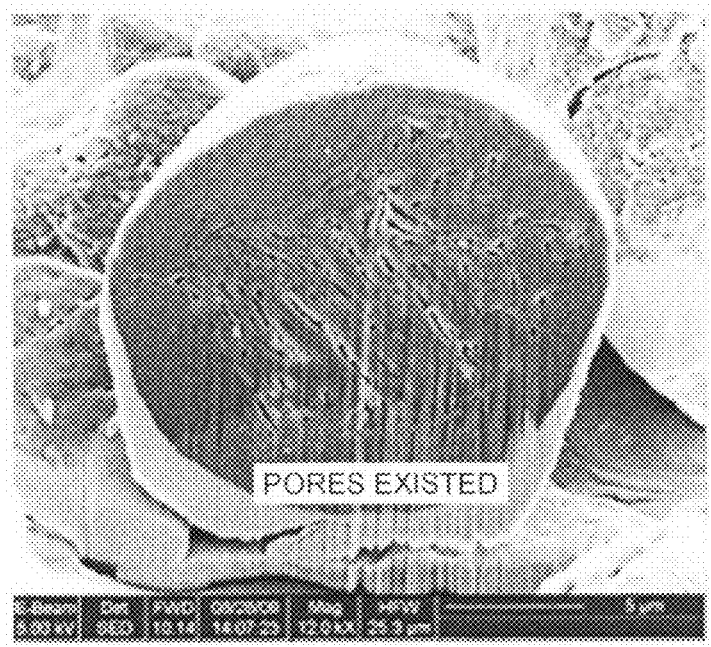
FIG. 9 is a TEM image of the secondary particle of Synthesis Example 1.

FIG. 9 is a TEM image of a cross-section of the secondary particle. Referring to FIG. 9, it can be seen that pores exist inside the secondary particle.

Figure 10:
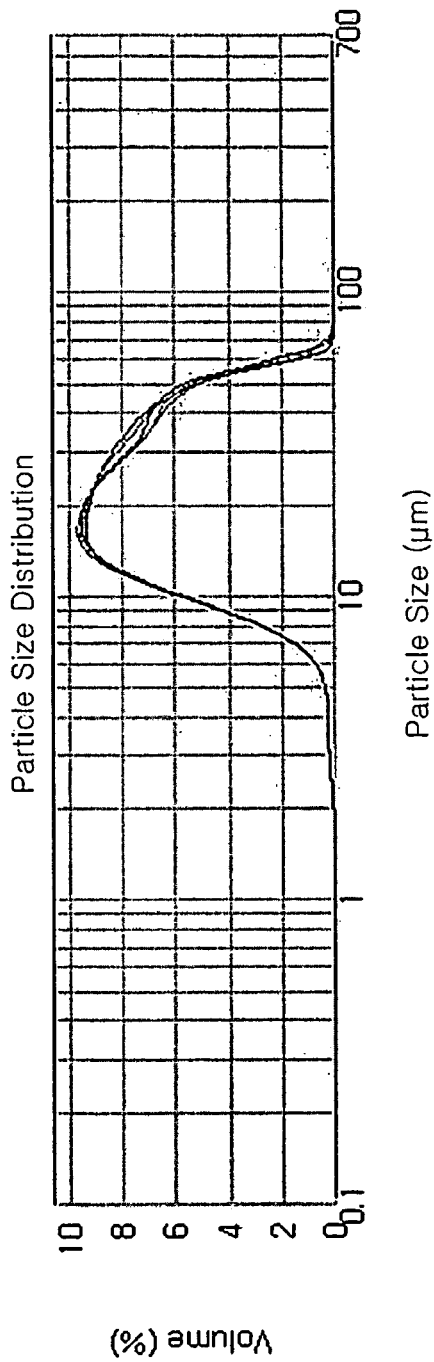
FIG. 10 is a graph showing particle size distribution results of the secondary particle of Synthesis Example 1.

A longer particle size distribution of the secondary particle was measured using a Hydro2000 (Malvern Instruments Ltd.). The results are shown in FIG. 10. Referring to FIG. 10, it is confirmed that $d_{50}$ of the longer particle diameter of the secondary particle is 20 µm. In addition, a BET specific surface area of the secondary particle was measured, and as a result of measurement, it was confirmed that the secondary particle has a BET specific surface area of 22 m²/g.

Synthesis Example 2

A secondary particle was prepared in the same manner as in Synthesis Example 1, except that after the primary particle was put into a spherizer, the product obtained by operating the spherizer was further heat-treated at 2000° C. for 60 minutes in an argon (Ar) atmosphere to obtain a secondary particle.

Comparative Example A

Figure 11:
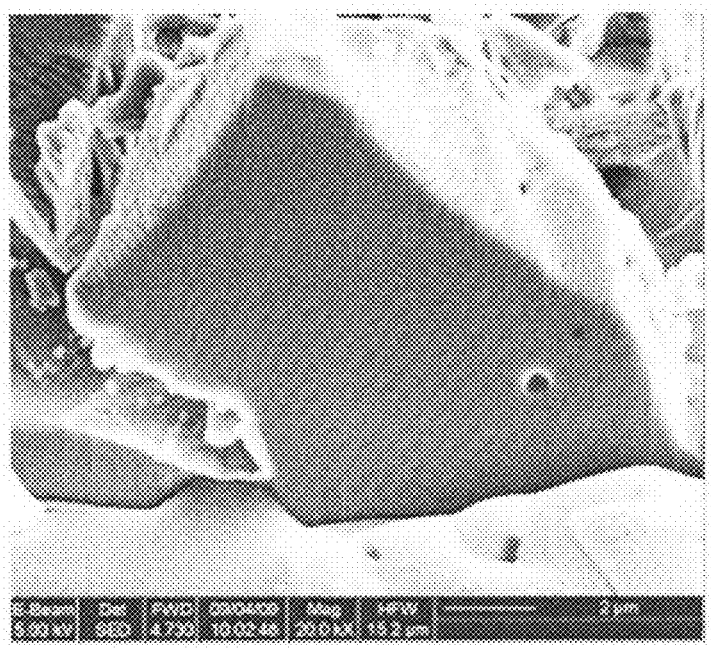
FIG. 11 is a TEM image of a cross-section of a hard carbon prepared according to Comparative Example A.

A hard carbon manufactured by Kureha (Product Name: carbotron PJ) was prepared. The $d_{50}$ of a longer particle diameter of the hard carbon was 10 µm. FIG. 11 is a TEM image showing a cross-section of the hard carbon. Referring to FIG. 11, it is confirmed that pores do not substantially exist inside of the hard carbon.

Comparative Example B

Graphite manufactured by Kansai Thermochemical Co., Ltd (Product Name: KPT). The $d_{50}$ of a longer particle diameter of the graphite is 11 µm.

Evaluation Example 1

Evaluation of Crystallinity

Figure 12:
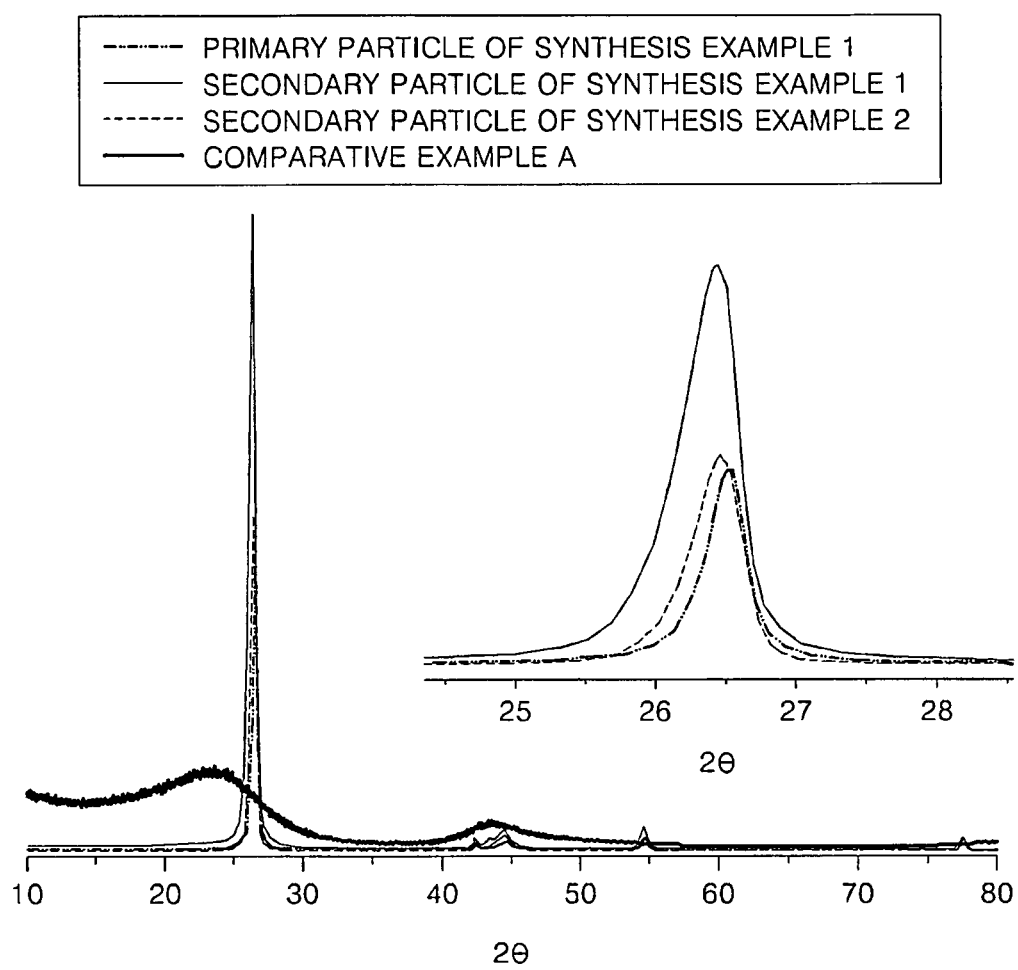
FIG. 12 is a graph showing x-ray diffraction (XRD) analysis results of the primary particle of Synthesis Example 1, the secondary particle of Synthesis Example 1, a secondary particle prepared according to Synthesis Example 2, and the hard carbon of Comparative Example A.

The crystallinities of the primary particle of Synthesis Example 1, the secondary particle of Synthesis Example 1, the secondary particle of Synthesis Example 2, and the hard carbon of Comparative Example A were measured using an X-ray diffractometer, and the results are shown in FIG. 12. A graph positioned at right and upper sides of FIG. 12 shows an enlarged view of peaks existing at 28 in a range of about 25 to about 28. From the results shown in FIG. 12, it is confirmed that the primary particle of Synthesis Example 1, the secondary particle of Synthesis Example 1, and the secondary particle of Synthesis Example 2 are highly crystalline, while the hard carbon of Comparative Example A is amorphous.

Example 1

A negative active material composed of the secondary particle of Synthesis Example 1 and a binder of polyvinylidene fluoride were mixed in a weight ratio of 94:6 in the solvent, N-methylpyrrolidone, to prepare a negative electrode slurry. The negative electrode slurry was coated on an aluminum (Al) foil to prepare a thin foil plate having a thickness of 90 µm, dried at 135° C. for 3 hours or longer, and pressed to have a thickness of 70 µm. The resulting foil plate was punched into a circular piece having a size of 13ϕ, and the circular piece was weighed and the weight thereof was recorded. Then, the circular piece was formed as a negative electrode to have a shape suitable for welding, and the weight thereof was recorded again. The negative electrode was welded to a bottom of a 2032 coin cell and evacuated in a vacuum oven at 250° C. for 5 hours. Next, a lithium electrode (positive electrode), a polyethylene separator having a thickness of 20 µm, and an electrolyte (containing a mixture of ethylene carbonate (EC) and ethylmethyl carbonate (EMC) in a volume ratio of 3:7 and 1.3 M $LiPF_6$) were assembled to manufacture a lithium battery having a density of 1.439 g/cc, a thickness of 40 nm, L/L:4)

Comparative Example 1

A lithium battery (density: 0.982 g/cc) was manufactured in the same manner as in Example 1, except that the hard carbon of Comparative Example A (carbotron PJ manufactured by Kureha) was used instead of the secondary particle of Synthesis Example 1.

Comparative Example 2

A lithium battery (density: 1.26 g/cc) was manufactured in the same manner as in Example 1, except that the graphite of Comparative Example B was used instead of the secondary particle of Synthesis Example 1.

Evaluation Example 2

Performance Evaluation of Battery

A formation process was performed in such a way that the lithium batteries of Example 1 and Comparative Examples 1 and 2 were maintained at room temperature (25° C.) for 20 hours and then charged and discharged at a charging/discharging rate of 0.1 C.

Figure 13:
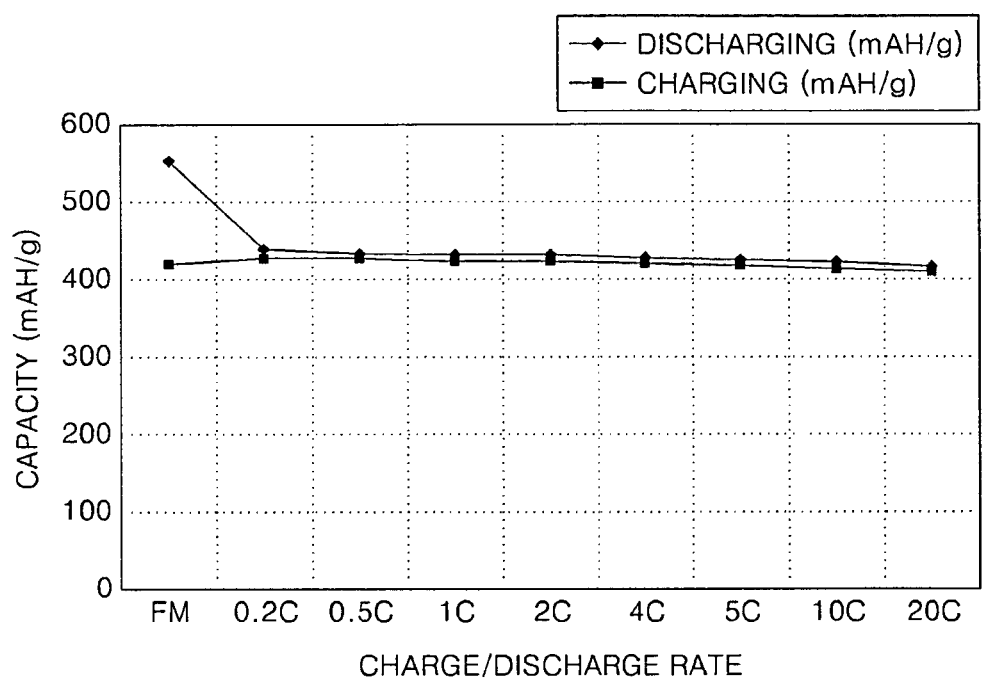
FIG. 13 is a graph showing charging and discharging of a lithium battery manufactured according to Example 1.

Next, the capacity of the lithium battery of Example 1 was measured during one cycle of charging and discharging, wherein charging was performed at a constant current (CC)/a constant voltage (CV) of 0.01 V at a charge/discharge rate of 0.2 C under a cut-off current of 0.01 C and discharging was performed at a current of 0.2 C under a cut-off voltage of 1.1 V. Subsequently, the charge/discharge rate was varied to FM (a charge/discharge rate of 0.1 C in the formation process), 0.5 C, 1 C, 2 C, 4 C, 5 C, 10 C, and 20 C, and the capacities of the lithium battery during charging and discharging were evaluated. The results are shown in FIG. 13. Referring to FIG. 13, it is confirmed that although a charge/discharge rate changes, the lithium battery of Example 1 has excellent charging/discharging efficiencies.

Figure 14:
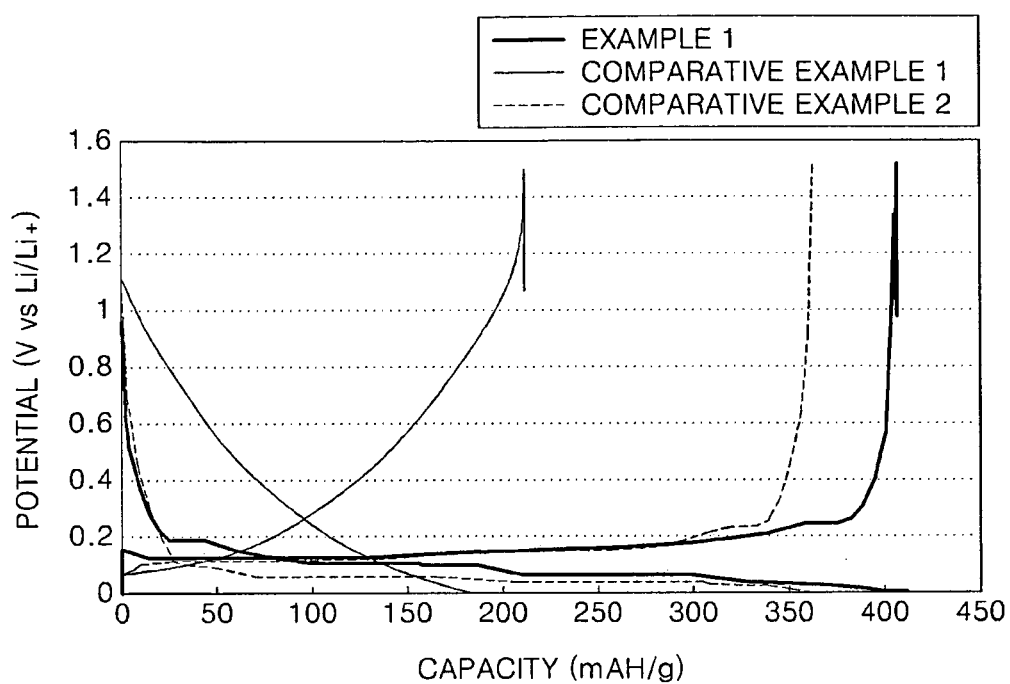
FIG. 14 is a graph of voltage-capacity characteristics of lithium batteries manufactured according to Example 1 and Comparative Examples 1 and 2.

In addition, initial capacity of each of the lithium batteries of Example 1 and Comparative Examples 1 and 2 was evaluated, and the results are shown in FIG. 14. The evaluation of the initial capacity of each lithium battery was carried out by performing one cycle of charging and discharging, wherein charging was performed at a constant current (CC)/a constant voltage (CV) of 0.01 V at a charge/discharge rate of 1 C under a cut-off current of 0.01 C and discharging was performed at a charge/discharge rate of 0.2 C under a cut-off voltage of 1.1 V. Referring to FIG. 14, it is confirmed that the lithium battery of Example 1 has higher capacity than those of the lithium batteries of Comparative Examples 1 and 2 (In FIG. 14, the capacity of the lithium battery of Example 1 is represented by a value calculated when the lithium battery has a density of 1.262 g/cc).

Figure 15:
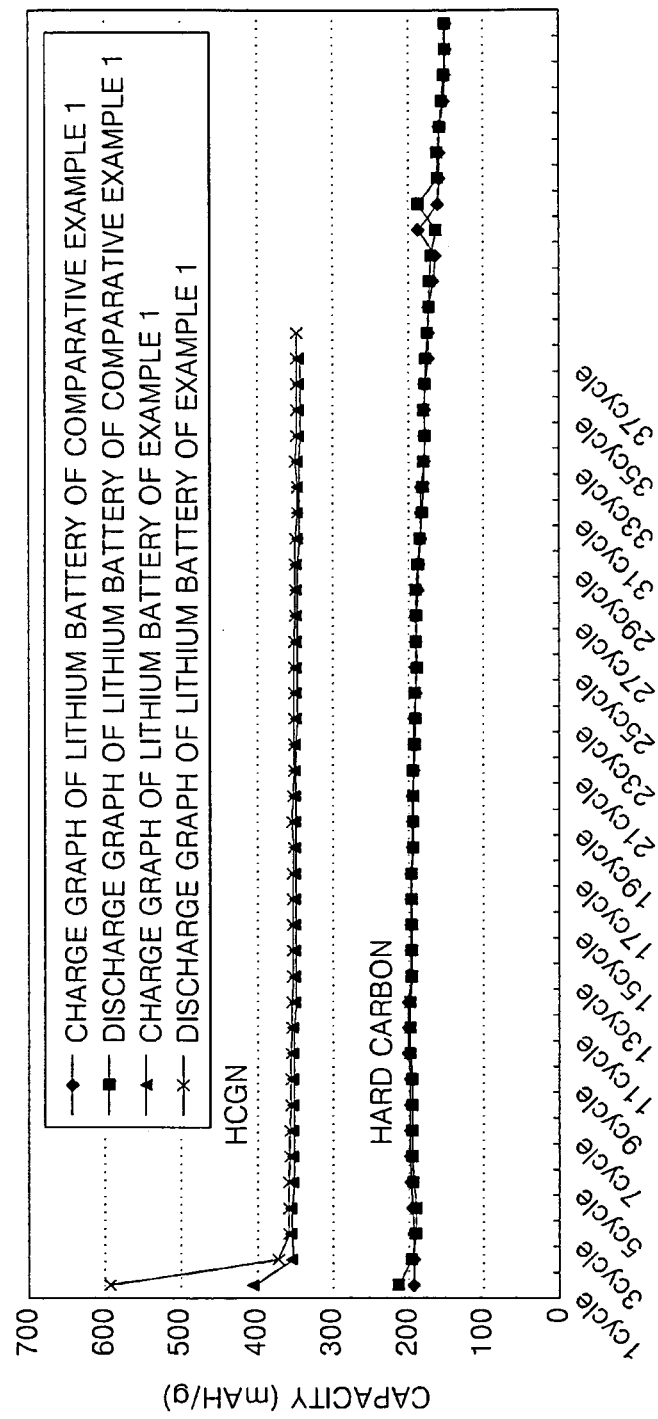
FIG. 15 is a graph showing cycle lifespan characteristics of the lithium batteries of Example 1 and Comparative Example 1.

In addition, the lithium batteries of Example 1 and Comparative Examples 1 and 2 were repeatedly subjected to a cycle of charging and discharging, wherein charging was performed at a constant current (CC)/a constant voltage (CV) of 0.01 V at a charge/discharge rate of 7 C under a cut-off current of 0.01 C and discharging was performed at a charge/discharge rate of 7 C under a cut-off voltage of 1.1V, and the capacities of each lithium battery during charging and discharging were measured. From the results, 7C/7C cycle lifespan of each lithium battery (cycle lifespan is represented as percentage by relative capacity based on 100% of capacity of initial cycle) was evaluated. In addition, the lithium batteries of Example 1 and Comparative Examples 1 and 2 were repeatedly subjected to a cycle of charging and discharging, wherein charging was performed at a constant current (CC)/a constant voltage (CV) of 0.01 V at a charge/discharge rate of 4 C under a charge cut-off current of 0.01 C and discharging was performed at a charge/discharge rate of 4 C under cut-off voltage of 1.1 V, and the capacities of each lithium battery during charging and discharging were measured. From the results, 4C/4C cycle lifespan of each lithium battery (cycle lifespan is represented as percentage by relative capacity based on 100% of capacity of initial cycle) was evaluated. FIG. 15 is a graph showing 7C/7C cycle lifespan of each of the lithium batteries of Example 1 and Comparative Example 1 (In FIG. 15, the cycle lifespan of each lithium battery is represented by a value calculated when the density of each lithium battery is 1 g/cc). Referring to FIG. 15, it is confirmed that the lithium battery of Example 1 has excellent cycle lifespan. The test results of performances of the lithium batteries of Example 1 and Comparative Examples 1 and 2 are shown in Table 1 below.

TABLE 1

| | Average discharge capacity | Performances |
|---|---|---|
| Comparative Example 1 | 150~200 mAh/g | 7 C/7 C cycle lifespan: 100% at 12 cycles |
| Comparative Example 2 | 360 mAh/g | Impossible to evaluate cycle lifespan at 5 C/5 C or grater |
| Example 1 | 350~380 mAh/g | 4 C/4 C cycle lifespan: 98% at 17 cycles 7 C/7 C cycle lifespan: 99% at 37 cycles |

Referring to Table 1, it can be seen that the lithium battery of Example 1 has both higher capacity and power characteristics than those of the lithium batteries of Comparative Examples 1 and 2.

As described above, according to the one or more of the above embodiments of the present invention, a secondary particle is highly conductive, and thus lithium ions may easily be intercalated into and deintercalated from the secondary particle. Thus, a lithium battery including the secondary particle may have excellent capacity and cycle lifespan.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A secondary particle consisting of a plurality of primary particles, each of the plurality of primary particles having a structure in which n polycyclic nano-sheets are stacked upon one another along a direction perpendicular with respect to a first plane, wherein:
    each of the polycyclic nano-sheets comprises hexagonal rings of six carbon atoms linked to each other, the hexagonal rings being fused to one another and arranged on the first plane,
    n is an integer from 2 to 100,
    a first carbon and a second carbon are selected from the n polycyclic nano-sheets to satisfy the condition $L1 \geq L2$, the first carbon and the second carbon being two carbons with the largest distance therebetween from among all carbons in the n polycyclic nano-sheets,
    L1 denotes a distance between the first carbon and the second carbon,
    L2 denotes a distance between a third carbon and a fourth carbon arbitrarily selected from the n polycyclic nano-sheets, the third and fourth carbons being neither identical to each other nor the same as the first and second carbons,
    in a three dimensional (3D) x, y, and z coordinate system, the second carbon is located at B(a, b, c) with respect to the first carbon located at the origin A(0, 0, 0),
    a and b are each independently about 10 µm or less, and c is about 1 nm to about 20 nm, wherein the secondary particle is an agglomeration of the plurality of primary particles and further comprises pores being empty spaces between the primary particles,
    wherein the secondary particle has pores therein,
    wherein the secondary particle has a porosity in a range of about 2% to about 40%, and
    wherein the secondary particle is of a sphere- or egg-type.

2. The secondary particle of claim 1, wherein adjacent carbon atoms in the polycyclic nano-sheets of each primary particle are linked by an $sp^2$ bond.

3. The secondary particle of claim 1, wherein a thickness of each of the polycyclic nano-sheets of each primary particle is in a range of the carbon atomic diameter plus or minus about one nanometer (±about 1 nm).

4. The secondary particle of claim 1, wherein n of the polycyclic nano-sheets is an integer from 2 to 10.

5. The secondary particle of claim 1, wherein c of each primary particle is in a range of the carbon atomic diameter× 50±about 10 nm.

6. The secondary particle of claim 1, wherein the secondary particle has a smooth surface.

7. The secondary particle of claim 1, wherein the secondary particle has a BET specific surface area in a range of about 1 $m^2$/g to about 50 $m^2$/g.

8. The secondary particle of claim 1, wherein the secondary particle has a carbon coating layer on a surface thereof.

9. The secondary particle of claim 8, wherein the carbon coating layer comprises a chemical deposition resultant product of carbon and/or a pyrolysate of coal-tar pitch, rayon, and/or polyacrylonitrile-based resin.

10. A lithium battery comprising:
a positive electrode comprising a positive active material;
a negative electrode comprising the secondary particle according to claim 1; and
an electrolyte.

11. The lithium battery of claim 10, wherein the positive electrode and/or the negative electrode further comprises a conducting agent, wherein the conducting agent further comprises at least one first material selected from the group consisting of carbon black, Ketjen black, acetylene black, artificial graphite, natural graphite, cupper powder, nickel powder, aluminum powder, silver powder, polyphenylene, and combinations thereof.

12. The lithium battery of claim 10, wherein the positive active material is selected from the group consisting of $Li_aNi_bCo_cMn_dG_eO_2$ where $0.90 \leq a \leq 1.1$, $0 \leq b \leq 0.9$, $0 \leq c \leq 0.5$, $0 \leq d \leq 0.5$, $e=0$, $LiMn_2O_4$, lithium titanate, and combinations thereof.

13. The secondary particle of claim 1, wherein the secondary particle has a $d_{50}$ of a longer particle diameter in a range of about 1 μm to about 50 μm.

14. The secondary particle of claim 1, wherein c of each primary particle is in a range of about 10 nm to about 20 nm.

* * * * *